United States Patent [19]
Smedley

[11] Patent Number: 5,393,274
[45] Date of Patent: Feb. 28, 1995

[54] TOUCH POINT IDENTIFICATION ALGORITHM FOR AUTOMATIC CLUTCH CONTROLLER

[75] Inventor: Daniel G. Smedley, Farmington Hills, Mich.

[73] Assignee: Eaton Corporation, Cleveland, Ohio

[21] Appl. No.: 94,874

[22] Filed: Jul. 19, 1993

[51] Int. Cl.⁶ .................. B60K 41/28; F16D 13/75
[52] U.S. Cl. .................. 477/74; 192/111 A
[58] Field of Search ............ 477/74, 77, 78, 86, 477/166, 171, 175, 180; 192/111 A

[56] References Cited

U.S. PATENT DOCUMENTS

| | | | |
|---|---|---|---|
| 4,629,045 | 12/1986 | Kasai et al. | 477/86 |
| 4,646,891 | 3/1987 | Braun | 192/111 A X |
| 4,899,858 | 2/1990 | Coté et al. | 192/111 A X |
| 5,029,678 | 7/1991 | Koshizawa | 192/111 A X |
| 5,065,849 | 11/1991 | Kono et al. | 477/86 |
| 5,065,851 | 11/1991 | Otsuka et al. | 192/111 A X |
| 5,314,050 | 5/1994 | Slicker et al. | 477/171 |
| 5,337,868 | 8/1994 | Liu et al. | 477/74 |
| 5,337,874 | 8/1994 | Oltean et al. | 192/111 A |

FOREIGN PATENT DOCUMENTS 2231116  11/1990  United Kingdom .

Primary Examiner—Richard M. Lorence
Attorney, Agent, or Firm—Young, McFarlane & Wood

[57] ABSTRACT

This invention provides automatic and reliable determination of the touch point of a clutch controlled by an automatic clutch actuation controller. This invention determines the touch point upon power-up while idling the engine, with the transmission in neutral and an input shaft brake applied. The clutch actuation controller gradually engages the clutch so that the measured transmission input speed matches a reference speed signal preferably between 40 and 60% of the idle speed. If the actuation is slow enough, this reliably provides the degree of clutch engagement at a small torque matching the braking torque which is the touch point. If there is no previous knowledge of the touch point, the clutch is applied at a fast rate and an approximate touch point is determined, then the clutch is positioned below the approximate touch point and is again applied at a slow rate to more accurately ascertain the touch point. If there is previous knowledge of the touch point, the clutch is positioned just below the old touch point and is applied at a slow rate to determine a new touch point. The new and old touch points may be combined to determine the updated touch point.

12 Claims, 4 Drawing Sheets

TOUCH POINT IDENTIFICATION ALGORITHM FOR AUTOMATIC CLUTCH CONTROLLER

TECHNICAL FIELD OF THE INVENTION

The technical field of this invention is that of automatic clutch controls, and more particularly the determination of the clutch position for initial torque transmission in an automatic clutch controller.

BACKGROUND OF THE INVENTION

In recent years there has been a growing interest in increased automation in the control of the drive train of motor vehicles, and most especially in control of the drive train of large trucks. The use of automatic transmissions in passenger automobiles and light trucks is well known. The typical automatic transmission in such a vehicle employs a fluid torque converter and hydraulically actuated gears for selecting the final drive ratio between the engine shaft and the drive wheels. This gear selection is based upon engine speed, vehicle speed and the like. It is well known that such automatic transmissions reduce the effectiveness of the transmission of power from the engine to the drive shaft, with the consummate reduction in fuel economy and power as compared with the skilled operation of a manual transmission. Such hydraulic automatic transmissions have not achieved wide spread use in large motor trucks because of the reduction in efficiency of the operation of the vehicle.

One of the reasons for the loss of efficiency when employing a hydraulic automatic transmission is loss occurring in the fluid torque converter. A typical fluid torque converter exhibits slippage and consequent loss of torque and power in all modes. It is known in the art to provide lockup torque converters that provide a direct link between the input shaft and the output shaft of the transmission above certain engine speeds. This technique provides adequate torque transfer efficiency when engaged, however, this technique provides no gain in efficiency at lower speeds.

It has been proposed to eliminate the inefficiencies inherent in a hydraulic torque converter by substitution of an automatically actuated friction clutch. This substitution introduces another problem not exhibited in the use of the hydraulic torque converters. Friction clutches used exhibit considerable motion prior to initial clutch engagement. This point of initial clutch engagement is called the touch point. No substantial torque can be transferred through the clutch for clutch engagement before the touch point. The clutch controller preferably uses the touch point as the zero position for its control algorithm. Since no substantial controlled torque transfer can take place prior to the touch point, the clutch controller preferably rapidly advances the clutch to this point when controlling clutch engagement.

Thus it would be an advantage to provide automatic clutch actuation of a friction clutch that includes a reliable and automatic manner for determination of the clutch touch point. One proposal to satisfy this need is presented in the U.S. patent application Ser. No. 07/815,501 entitled TOUCH POINT IDENTIFICATION FOR AUTOMATIC CLUTCH CONTROLLER and assigned to the assignee of this invention. There the touch point is correctly identified but substantial time is required. The present invention is much faster, especially where the touch point history is known.

SUMMARY OF THE INVENTION

This invention provides automatic and reliable determination of the touch point of a clutch controlled by an automatic clutch actuation controller. This invention is employed in a combination including an engine, a friction clutch, a multi-speed transmission having a neutral position, an input shaft brake, at least one traction wheel connected to the output of the multi-speed transmission, and an automatic clutch controller.

This invention determines the touch point while idling the engine, with the transmission in neutral and an input shaft brake applied. This input shaft brake is ordinarily used to slow the transmission input shaft to match speeds during up shifts. The braking torque of the input shaft brake is about 5% of the idling torque of the engine. The touch point is determined or updated each time the engine is powered up.

If the vehicle is being operated for the first time or for some other reason there is no prior knowledge of the touch point, the touch point determination is made in two steps. In each step the clutch actuation controller engages the clutch so that the measured transmission input speed matches a reference speed less than the idle speed. In the preferred embodiment the reference speed is between 40% and 60% of the idle speed. The first step quickly determines an approximation of the touch point by rapidly advancing clutch in the closing direction until the input speed matches the reference speed; due to limited system response, this likely will yield an approximation higher (more fully engaged) than the desired touch point. Then the clutch is fully released and quickly moved to a position at an offset amount below the approximate touch point, and slowly applied to again attain a match of the transmission input speed and the reference speed. The degree of clutch engagement at this event is the touch point used for subsequent clutch actuation control.

In most cases the touch point is already established from previous operation and stored in computer memory. Due to factors such as clutch wear and temperature changes, the touch point can change, and the stored touch point is therefor updated upon each power-up. The clutch is actuated to a position offset below the stored touch point and gradually advanced until the transmission input speed reaches the reference speed. The new touch point identified at that event may be used as the updated touch point, or a blend of the stored and the new values may be used to determine the updated touch point.

BRIEF DESCRIPTION OF THE DRAWINGS

These and other objects and aspects of the present invention will be described below in conjunction with the drawings in which.

DETAILED DESCRIPTION OF THE INVENTION

Figure 1:
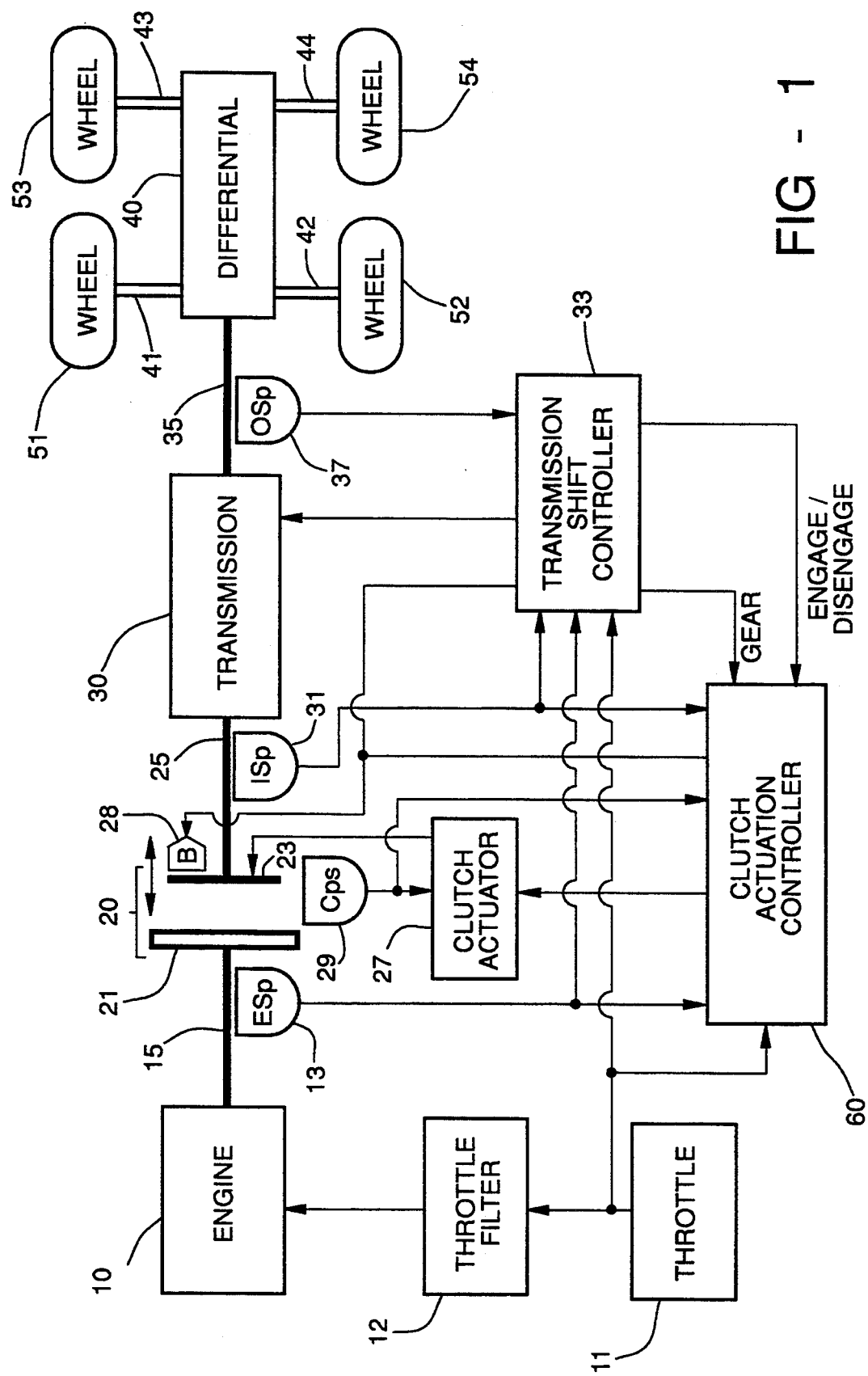
FIG. 1 illustrates a schematic view of the vehicle drive train including the clutch actuation controller of the present invention.

FIG. 1 illustrates in schematic form the drive train of a motor vehicle including the automatic clutch controller of the present invention. The motor vehicle includes engine 10 as a source of motive power. For a large truck of the type to which the present invention is most applicable, engine 10 would be a diesel internal combustion engine. Throttle 11, which is typically a foot operated pedal, controls operation of engine 10 via throttle filter 12. Throttle filter 12 filters the throttle signal supplied to engine 10 by supplying a ramped throttle signal upon receipt of a step throttle increase via throttle 11. Engine 10 produces torque on engine shaft 15. Engine speed sensor 13 detects the rotational velocity of engine shaft 15. The actual site of rotational velocity detection by engine speed sensor may be at the engine flywheel. Engine speed sensor 13 is preferably a multitooth wheel whose tooth rotation is detected by a magnetic sensor.

Friction clutch 20 includes fixed plate 21 and movable plate 23 that are capable of full or partial engagement. Fixed plate 21 may be embodied by the engine flywheel. Friction clutch 20 couples torque from engine shaft 15 to transmission input shaft 25 corresponding to the degree of engagement between fixed plate 21 and movable plate 23. Note that while FIG. 1 illustrates only a single pair of fixed and movable plates, those skilled in the art would realize that clutch 20 could include multiple pairs of such plates.

Figure 2:
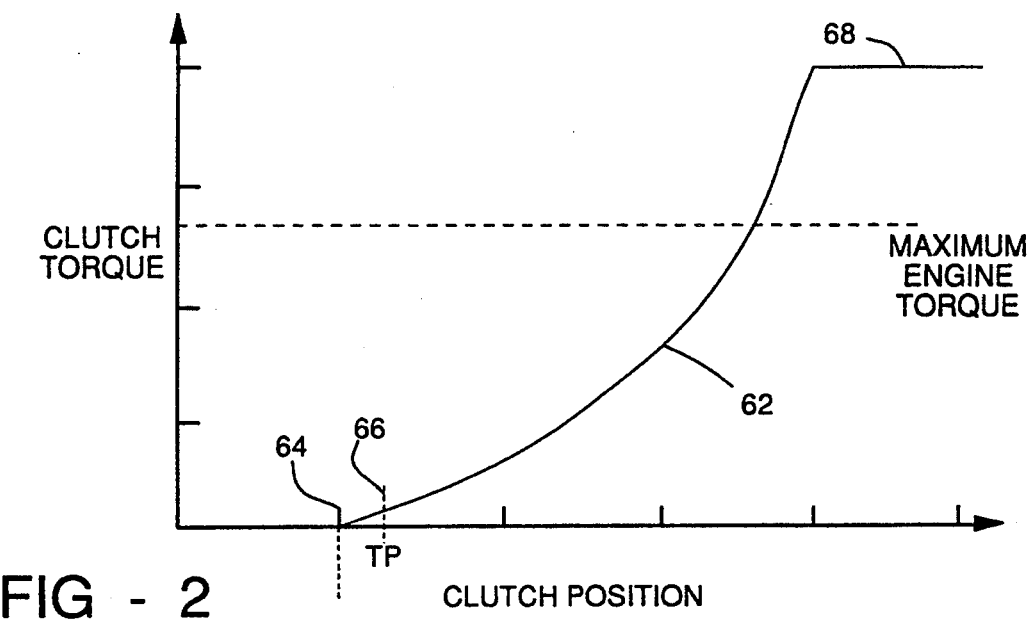
FIG. 2 illustrates the typical relationship between clutch engagement and clutch torque.

A typical torque verses clutch position function is illustrated in FIG. 2. Clutch torque/position curve 62 is initially zero for a range of engagements before an incipient engagement point 64. Clutch torque rises monotonically with increasing clutch engagement. The touch point 66 is selected as that degree of engagement which allows a small fixed brake torque to be overcome to drive the transmission input shaft to a reference speed. In the example illustrated in FIG. 2, clutch torque rises slowly at first and then more steeply until the maximum clutch torque is reached upon full engagement at point 68. The typical clutch design calls for the maximum clutch torque upon full engagement to be about 1.5 times the maximum engine torque. This ensures that clutch 20 can transfer the maximum torque produced by engine 10 without slipping.

Clutch actuator 27 is coupled to movable plate 23 for control of clutch 20 from disengagement through partial engagement to full engagement. Clutch actuator 27 may be an electrical, hydraulic or pneumatic actuator and may be position or pressure controlled. Clutch actuator 27 controls the degree of clutch engagement according to a clutch engagement signal from clutch actuation controller 60 which preferably includes a microprocessor programmed to carry out the control principles set forth herein. In accordance with the preferred embodiment of this invention, clutch actuator 27 is a closed loop controller. Clutch actuator 27 controls the degree of clutch engagement to cause the measured clutch position from clutch position sensor 29 to follow the clutch engagement signal. The touch point determination preferably employs the measured clutch position from clutch position sensor 29. Those skilled in the art would realize that clutch actuator 27 may be pressure controlled by a clutch actuation signal corresponding to the desired clutch pressure and employ clutch pressure feedback measured by a clutch pressure sensor.

Transmission input speed sensor 31 senses the rotational velocity of transmission input shaft 25, which is the input to transmission 30. Transmission 30 provides selectable drive ratios to drive shaft 35 under the control of transmission shift controller 33. Drive shaft 35 is coupled to differential 40. Transmission output speed sensor 37 senses the rotational velocity of drive shaft 35. Transmission input speed sensor 31 and transmission output speed sensor 37 are preferably constructed in the same manner as engine speed sensor 13. Where the motor vehicle is a large truck, differential 40 drives four axle shafts 41 to 44 that are in turn coupled to respective wheels 51 to 54.

Transmission shift controller 33 receives input signals from throttle 11, engine speed sensor 13, transmission input speed sensor 31 and transmission output speed sensor 37. Transmission shift controller 33 generates gear select signals for control of transmission 30 and clutch engage/disengage signals coupled to clutch actuation controller 60. Transmission shift controller 33 preferably changes the final gear ratio provided by transmission 30 corresponding to the throttle setting, engine speed, transmission input speed and transmission output speed. Transmission shift controller 33 provides respective engage and disengage signals to clutch actuation controller 60 depending on whether friction clutch 20 should be engaged or disengaged. Transmission shift controller also transmits a gear signal to clutch actuation controller 60. This gear signal permits recall of the set of coefficients corresponding to the selected gear. Transmission shift controller 33 preferably briefly engages input shaft brake 28 during upshifts. This slows the rotational speed of transmission input shaft 25 to match that of drive shaft 35 before engaging the higher gear. The touch point determination of this invention preferably employs input shaft brake 28 in a manner that will be described below. Note transmission shift controller 33 forms no part of the present invention and will not be further described.

Clutch actuation controller 60 provides a clutch engagement signal to clutch actuator 27 for controlling the position of movable plate 23. This controls the amount of torque transferred by clutch 20 according to clutch torque/position curve 62 of FIG. 2. Clutch actuation controller 60 operates under the control of transmission shift controller 33. Clutch actuation controller 60 controls the movement of moving plate 23 from disengagement to at least partial engagement or full engagement upon receipt of the engage signal from transmission shift controller 33. It is contemplated that the clutch engagement signal will indicate a desired clutch position. Clutch actuator 27 preferably includes a closed loop control system employing the measured clutch position from clutch position sensor 29 for controlling movable plate 23 to this desired position. It is also feasible for the clutch engagement signal to represent a desired clutch pressure with clutch actuator 27 providing closed loop control to this desired pressure. Depending on the particular vehicle, it may be feasible for clutch actuator 27 to operate in an open loop fashion. The exact details of clutch actuator 27 are not crucial to this invention and will not be further discussed.

Clutch actuation controller 60 preferably generates a predetermined open loop clutch disengagement signal for a ramped out disengagement of clutch 20 upon receipt of the disengage signal from transmission shift controller 33. No adverse oscillatory responses are anticipated for this predetermined open loop disengagement of clutch 20.

The control function of clutch actuation controller 60 is needed only for clutch positions between touch point 66 and full engagement. Clutch engagement less than that corresponding to touch point 66 provides only slight torque transfer because clutch 20 is nearly disengaged. The present invention is a manner of detection of the clutch position corresponding to touch point 66. Upon receipt of the engage signal from transmission shift controller 33, clutch actuation controller 60 preferably rapidly advances clutch 20 to a point corresponding to touch point 66. This sets the zero of the clutch engagement control at touch point 66. Thereafter the clutch engagement is controlled by the control function of clutch actuation controller 60.

Determination of the touch point involves putting transmission 30 in neutral and applying input shaft brake 29. Conceptually, clutch 20 could be progressively engaged, starting at a fully disengaged condition, while engine 10 is idling until the transmission input speed reaches a predetermined fraction of the engine idle speed. This degree of clutch engagement, corresponding to point 66 of FIG. 2, transfers torque through clutch 20 to overcome the slight braking torque of input shaft brake 29. To assure that the clutch movement does not overshoot the mark due to a delay in system response, the clutch engagement would have to proceed at a low rate, requiring a long time to make the determination. This problem is addressed here by first determining the approximate touch point, and beginning the relatively slow progressive engagement from a point just below that approximate touch point so that the input speed reaches its target accurately and also quickly, in spite of the slow engagement speed.

The touch point determination process begins with setting the proper initial conditions. These initial conditions include engine 10 idling, transmission 30 in neutral and input shaft brake 28 engaged. Input shaft brake 28 is normally present to aid in matching the rotational speed of transmission input shaft 25 to that of drive shaft 35 during upshifts. Because clutch 20 is disengaged during the shift the amount of braking needed is very small. Input shaft brake 28 need only develop a braking torque of about 5% of the idling engine torque. Another initial condition to be set or selected is the reference speed. This reference speed should correspond to about 40% to 60% of the engine idle speed and may be a parameter embedded in computer memory. This reference speed must be less than the engine idle speed because the touch point determination requires clutch slippage while engine 10 idles.

Figure 3:
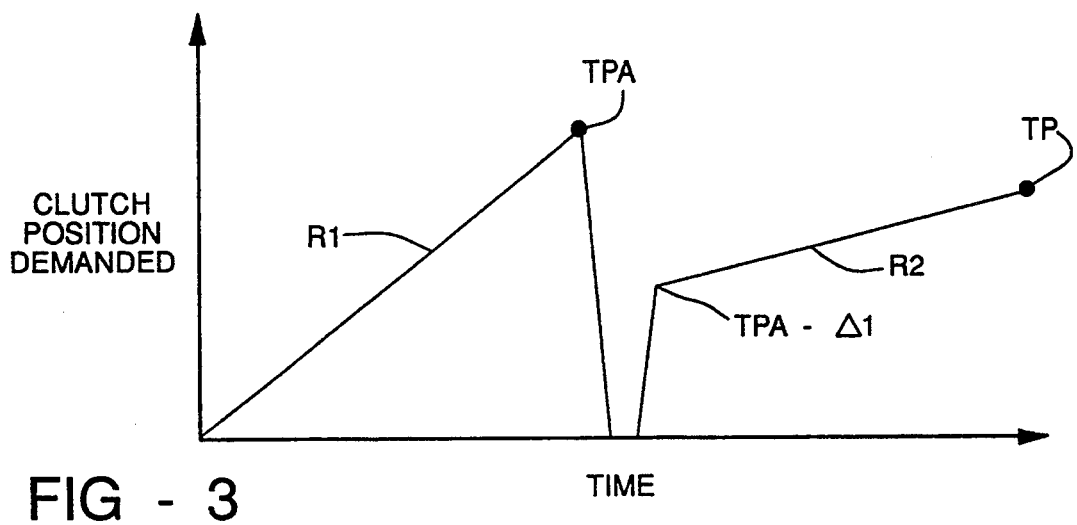
FIG. 3 is a diagram of clutch position illustrating the determination of touch point by a two-step process used in the absence of prior knowledge of the touch point value according to the invention.
Figure 4:
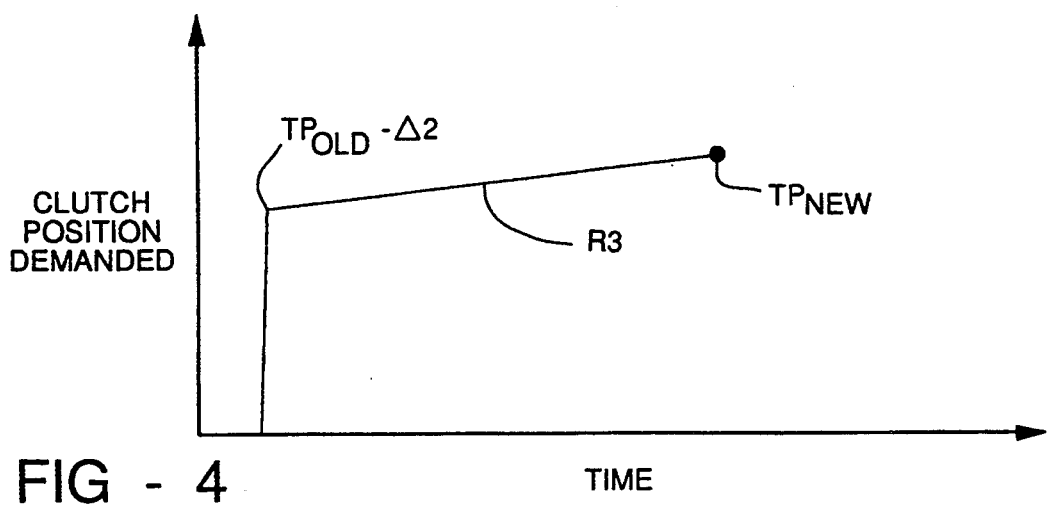
FIG. 4 is a diagram of clutch position illustrating the determination of touch point using prior knowledge of the touch point value according to the invention.

FIGS. 3 and 4 illustrate by clutch position curves two methods for the determination of the touch point 66 for clutch 20. In the event that the controller 60 has not accumulated historical data on the touch point, the two-stage method of FIG. 3 is used, whereas if the touch point is already approximately known, a single step method of FIG. 4 is used.

According to FIG. 3, an approximate touch point TPA is determined by progressively engaging the clutch at a relatively rapid first rate R1 until the sensed transmission input speed attains the reference speed. The rapid rate R1 is chosen to hasten the measurement of the approximate touch point TPA. In practice the finite response of the system allows the transmission speed to exceed the reference speed at the rapid rate R1; thus it is expected that the accurate value of the touch point will be below the value of TPA. The first step concludes by returning the clutch to its fully disengaged position. The second step comprises quickly moving the clutch to a position below the approximate touch point by an offset value $\Delta 1$ or $TPA - \Delta 1$, and slowly engaging the clutch at a second rate R2. Because of the slow rate of clutch movement, the touch point TP is accurately determined when the transmission input speed attains the reference speed. The particular rates depend on the specific application. It has been found for at least one application a rate R2 of about one fourth of the rate of R1 is desirable.

FIG. 4 illustrates the single stage of determining the touch point when a touch point value $TP_{old}$ is used from the previous operation of the vehicle. The value of $TP_{old}$ is expected to be fairly close to the current value of the touch point, and thus the clutch engagement movement can start at a small offset $\Delta 2$ below $TP_{old}$, or $TP_{old} - \Delta 2$. The offset $\Delta 2$ is smaller than the offset $\Delta 1$ used in the first method because of the greater confidence in the accuracy of $TP_{old}$ than in TPA. From that starting point the clutch is slowly engaged at the rate R2 until the input speed matches the reference speed to determine the new touch point $TP_{new}$. That new value of TP may be used as the current value, or, if a filtering function is desired, the current value of TP may be a function of both $TP_{old}$ and $TP_{new}$, such as $TP = 0.25\ TP_{new} + 0.75\ TP_{old}$; then any changes in the touch point will be adapted gradually. While the clutch application rate R2 is preferred, another low rate may be used.

Figure 5:
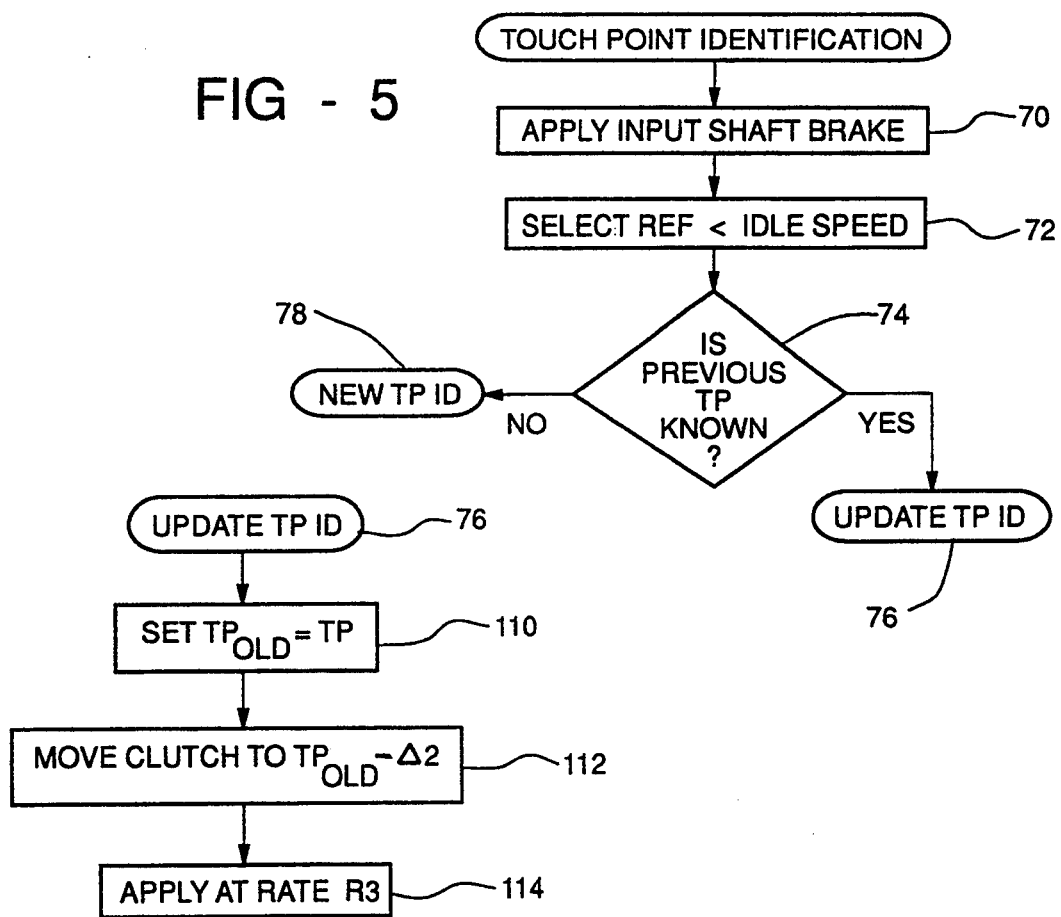
FIGS. 5–7 are flow charts representing the methods of determining touch points according to the invention.
Figure 7:
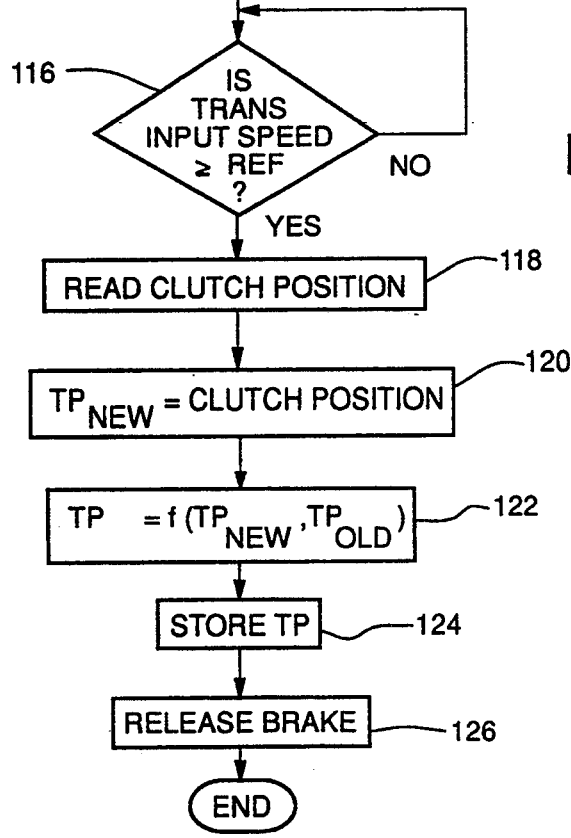
Figure 6:
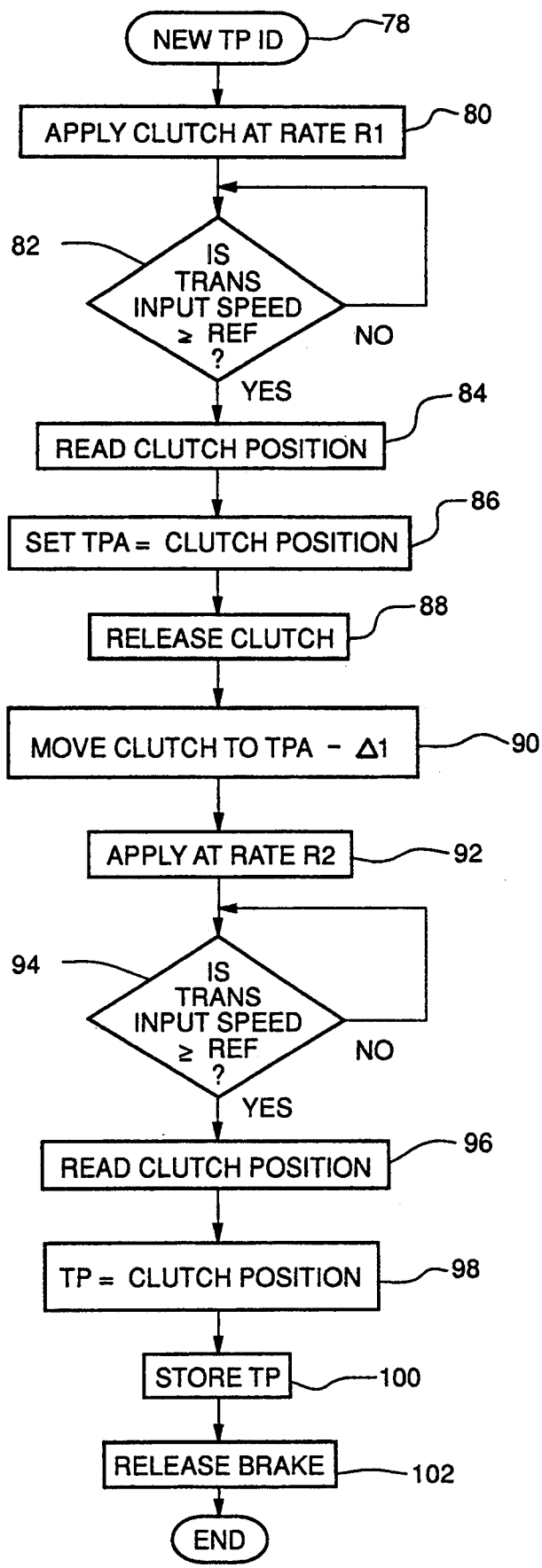

The process of determining the touch point is preferably a subset of the control function of clutch actuation controller 60. In particular, the process is preferably carried out by a microprocessor having a memory incorporating program instructions. The flow charts of FIGS. 5-7 are representative of the type of program useful to make the necessary determinations. Each step in the flow charts is represented by a reference numeral, and the ensuing description refers to functions with numerals in angle brackets, <nn>, relating to corresponding reference numerals.

FIG. 5 is the beginning of a program for touch point identification. The input shaft brake is commanded to be applied to the transmission input shaft <70> and the reference speed is selected as a value less than engine idle speed <72>. If a previous value is known for the touch point <74>, an update routine is entered <76>, otherwise a New Touch Point ID routine is entered <78>.

The New Touch Point ID routine 78 is shown in FIG. 6. The clutch is commanded to be applied at the rapid rate R1 <80>. The transmission input speed is repeatedly compared to the reference speed <82> until the reference speed is attained. Then the clutch position is read <84>, and the approximated touch point TPA is set equal to the clutch position <86>. Then the clutch is released <88> and subsequently moved to position TPA less the offset $\Delta 1$ <90>. From that position the clutch is progressively engaged at the slow rate R2 <92>. The transmission input speed is again compared to the reference speed <94> and the clutch position is read when the speed is attained <96>. The value of the clutch position is assigned to TP <98> which is stored in the memory <100> and finally the input shaft brake is released <102>. Thus the touch point TP is initially determined.

The Update Touch Point ID routine 76 is shown in FIG. 7. There a value of TP already exists in the microprocessor memory. That value is assigned to $TP_{old}$ <110>. The clutch is actuated to quickly move to the position of $TP_{old}-\Delta 2$ <112> and then is slowly engaged at the rate R2 <114>. The transmission input speed is compared to the reference speed <116> and when the reference speed is attained, the clutch position is read <118>. The clutch position is assigned to $TP_{new}$ <120> and a current value of touch point is calculated as a function of $TP_{old}$ and $TP_{new}$ <122>. If desired the TP may be set equal to $TP_{new}$. The value of TP is stored <124> and the input shaft brake is released <126> to complete the touch point determination.

It should be noted that while the clutch actuation feedback is described in terms of clutch position, clutch pressure can be used instead.

The algorithm presented herein affords a technique for determining clutch touch point in a manner which is accurate as well as fast. The entire process for either case of previously known or unknown touch point is accomplished within half of the time of previous systems if the previous touch point is not known, and within one fifth of the time if the previous touch point is known. Existing apparatus is used since the input shaft brake, the sensors and the microprocessor are all used in the clutch control during a transmission shift.

The embodiments of the invention in which an exclusive property or privilege is claimed are defined as follows:

1. In a combination including a source of motive power having a predetermined idle speed, a friction clutch for controllably transferring torque from the source of motive power to a transmission input shaft, a multi-speed transmission having an output shaft and including a neutral position, at least one traction wheel connected to the output shaft of the transmission, and an automatic clutch controller for control of the degree of clutch engagement, a method of determining the touch point of the friction clutch comprising the steps of:
   operating the source of motive power at the idle speed;
   selecting the neutral position of the transmission;
   applying a predetermined braking torque to the transmission input shaft;
   selecting a reference speed less than the idle speed;
   sensing the rotational speed of the transmission input shaft;
   applying the friction clutch at a first rate of application;
   sensing a first degree of clutch engagement when the transmission input speed attains the reference speed;
   releasing the clutch by changing the degree of clutch engagement by a first offset amount from the first degree of clutch engagement;
   applying the friction clutch at a second rate of application which is less than the first rate; and
   sensing the clutch touch point when the transmission input speed attains the reference speed during application at the second rate.

2. The invention as defined in claim 1 wherein the step of sensing the clutch touch point comprises sensing the degree of clutch engagement when the transmission input speed attains the reference speed.

3. The invention as defined in claim 2 wherein the steps of sensing the degree of clutch engagement comprise measuring the pressure of the friction clutch; and
   the touch point is the clutch pressure sensed when the transmission speed attains the reference speed.

4. The invention as defined in claim 2 wherein the steps of sensing the degree of clutch engagement comprise measuring the position of the friction clutch; and
   the touch point is the clutch position sensed when the transmission speed attains the reference speed.

5. The invention as defined in claim 1 wherein the second rate of application is on the order of one fourth of the first rate of application, whereby the touch point is accurately ascertained.

6. The invention as defined in claim 1 including the steps of:
   storing the clutch touch point; and
   updating the touch point during subsequent operation by the steps of;
      applying the friction clutch to a degree of clutch engagement at a second offset amount less than the stored touch point, the second offset amount being less than the first offset amount;
      applying the friction clutch at a third rate less than the first rate;
      sensing a new clutch touch point when the transmission input speed attains the reference speed during application at the third rate; and
      determining an updated clutch touch point based on the sensed new touch point.

7. The invention as defined in claim 6 wherein the third rate of clutch application is equal to the second rate.

8. The invention as defined in claim 6 wherein the step of determining an updated clutch touch point comprises setting the updated touch point equal to the new touch point.

9. The invention as defined in claim 6 wherein the step of determining an updated clutch touch point comprises calculating an updated clutch touch point as a blend of the stored clutch touch point and the new clutch touch point.

10. In a combination including a source of motive power having a predetermined idle speed, a friction clutch for controllably transferring torque from the source of motive power to a transmission input shaft, a multi-speed transmission having an output shaft and including a neutral position, at least one traction wheel connected to the output shaft of the transmission, an automatic clutch controller for control of the degree of clutch engagement, and a memory for storing a determined clutch touch point, a method of updating the touch point of the friction clutch comprising the steps of:
   operating the source of motive power at the idle speed;
   selecting the neutral position of the transmission;
   applying a predetermined braking torque to the transmission input shaft;
   selecting a reference speed less than the idle speed;
   sensing the rotational speed of the transmission input shaft;
   engaging the clutch to the degree of engagement of the stored touch point less a small offset so that the degree of clutch engagement is just below the stored touch point;
   applying the clutch at a low application rate;

sensing a new clutch touch point when the transmission input speed attains the reference speed; and determining an updated clutch touch point based on the sensed new touch point.

11. The invention as defined in claim 10 wherein the step of determining an updated clutch touch point comprises setting the updated touch point equal to the new touch point.

12. The invention as defined in claim 10 wherein the step of determining an updated clutch touch point comprises calculating an updated clutch touch point as a blend of the stored clutch touch point and the new clutch touch point.

* * * * *